United States Patent
Hsu et al.

(10) Patent No.: US 7,684,638 B2
(45) Date of Patent: Mar. 23, 2010

(54) DYNAMIC IMAGE CONTRAST ENHANCEMENT DEVICE

(75) Inventors: Kai-Hsiang Hsu, Tucheng (TW); Hsu-Hung Chen, Sanchung (TW); Hsu-Pin Kao, Pingjen (TW); Yi-Sheng Yu, Taoyuan (TW)

(73) Assignee: Quanta Computer Inc., Tao Yuan Shien (TW)

( * ) Notice: Subject to any disclaimer, the term of this patent is extended or adjusted under 35 U.S.C. 154(b) by 434 days.

(21) Appl. No.: 11/199,952

(22) Filed: Aug. 8, 2005

(65) Prior Publication Data

US 2006/0182366 A1     Aug. 17, 2006

(30) Foreign Application Priority Data

Feb. 15, 2005   (TW) .............................. 94104336 A

(51) Int. Cl.
*G06K 9/40*   (2006.01)
(52) U.S. Cl. ..................................... 382/274
(58) Field of Classification Search ................. 382/274
See application file for complete search history.

(56) References Cited

U.S. PATENT DOCUMENTS

| | | | | |
|---|---|---|---|---|
| 5,854,851 | A * | 12/1998 | Bamberger et al. | 382/132 |
| 6,594,388 | B1 * | 7/2003 | Gindele et al. | 382/167 |
| 2002/0118889 | A1 * | 8/2002 | Shimizu | 382/274 |
| 2002/0141638 | A1 * | 10/2002 | Lee et al. | 382/165 |
| 2003/0021478 | A1 * | 1/2003 | Yoshida | 382/195 |
| 2004/0036703 | A1 | 2/2004 | Aoki et al. | |

FOREIGN PATENT DOCUMENTS

| | | |
|---|---|---|
| CN | 1477864 A | 4/2003 |
| JP | 2000-196890 | 12/1998 |
| JP | 2001-86356 A | 9/1999 |
| JP | 2003-36438 | 7/2001 |
| JP | 2004-078074 | 8/2002 |

(Continued)

OTHER PUBLICATIONS

"Utilization and Color Interspace of Lab and LCH", pp. 53-55, in Chinese with abstract in English.

(Continued)

*Primary Examiner*—Bhavesh M Mehta
*Assistant Examiner*—David P Rashid
(74) *Attorney, Agent, or Firm*—Stites & Harbison PLLC; Juan Carlos A. Marquez, Esq.

(57) ABSTRACT

This invention provides a dynamic image adjusting apparatus for dynamically adjusting the contrast of a first image signal which includes a plurality of pixels. The adjusting apparatus includes a first transformation module, an operation module, and a second transformation module. The first transformation module receives the first image signal for generating a plurality of adjusting signals, wherein each pixel of the first image signal corresponds to one of the plurality of adjusting signals. The operation module is coupled to the first transformation module and receives a first set of adjusting signals of the plurality of adjusting signals to generate a first gain curve. The second transformation module is coupled to the operation module and the first transformation module, and generates a second image signal according to the first gain curve and the plurality of adjusting signals.

7 Claims, 4 Drawing Sheets

FOREIGN PATENT DOCUMENTS

| | | |
|---|---|---|
| JP | 2004-266755 A | 3/2003 |
| TW | 591941 B | 2/2003 |

OTHER PUBLICATIONS

"Color Harmony System Based on Lab Perceptual Uniform Color Space", Journal of Northwestern Polytechnical University, vol. 22, No. 6, Dec. 2004, pp. 695-698, in Chinese with abstract in English.

Liu, Dong-lin, "Utilization and Color Interspace of Lab and LCH", Print Today, No. 10, 2002, pp. 53-55, in Chinese with abstract in English.

Wang, Ke, et al., "Color Harmony System Based on Lab Perceptual Uniform Color Space", Journal of Northwestern Polytechnical University, vol. 22, No. 6, Dec. 2004, pp. 695-698, in Chinese with abstract in English.

* cited by examiner

DYNAMIC IMAGE CONTRAST ENHANCEMENT DEVICE

BACKGROUND OF THE INVENTION

1. Field of the Invention

This invention is related to an image processing apparatus. More specifically, this invention is related to an image adjusting apparatus for dynamically adjusting the contrast of image signals.

2. Description of the Prior Art

Generally, the contrast of a natural image is related to the brightness ratio between light areas and dark areas in the image. Although the increase of contrast might result in slight distortion for an image, a proper increase in the contrast provides more comfortable visual feelings for most people. Hence, how to enhance the contrast of images is an important issue of image processing.

In prior arts, the contrasts of images can be enhanced by adjusting the Gamma parameter of monitors, that is to say, the contrasts are adjusted by changing the relation between gray scale levels and brightness of the monitor. Most monitors provide several Gamma parameters or a function of on screen display (OSD) for users to adjust contrasts. But a constant contrast setting cannot fit every image. For example, contrasts of images with higher brightness can be increased by setting a larger Gamma value. But applying a larger Gamma value on an image with lower brightness would worsen the quality of the image by making the areas of low brightness too dark and losing details. Therefore, better contrast adjustments must be dynamic according to different images, that is, adjustments should be made according to the brightness of individual image.

The idea of enhancing contrasts is to make the bright part of an image brighter and make the darker part darker. At the same time, the colors of images should not be affected. It is better to adjust contrasts in Y/C color spaces than in traditional RGB color spaces because each RGB signals respectively includes a brightness component and a color component and the brightness component which relates to contrasts cannot be individually adjusted unless the two components are separated. On the contrast, brightness and colors are separated as YPbPr signals or YCbCr signals in some high quality image signals. In prior arts, some monitors use video decoders or scaler chips to change the Y vector of YPbPr signals or YCbCr signals, such that the contrast of an image is adjusted. In prior arts, most methods for adjusting contrasts use YCbCr signals or YPbPr signals. However, as for the quality of separating brightness and colors, YCbCr and YPbPr signals are worse than CIE Lab signals.

Accordingly, this invention provides a dynamic image adjusting apparatus to overcome aforementioned problems. Furthermore, the color space used in this invention is the CIE Lab color space proposed by CIE (Commission Internationale de L'Éclairage).

SUMMARY OF THE INVENTION

The main purpose of this invention is providing a dynamic image adjusting apparatus for dynamically adjusting the contrasts of different image signals.

In one preferred embodiment according to this invention, the dynamic image adjusting apparatus is used for adjusting the contrast of a first image signal which includes a plurality of pixels. The adjusting apparatus includes a first transformation module, an operation module, and a second transformation module. The first transformation module receives the first image signal for generating a plurality of adjusting signals, and each pixel of the first image signal respectively corresponds to one of the adjusting signals. The operation module is coupled to the first transformation module and receives a first set of adjusting signals among the plurality of adjusting signals to generate a first gain curve. The second transformation module is coupled to the operation module and the first transformation module, and generates a second image signal according to the first gain curve and the plurality of adjusting signals.

The dynamic adjusting apparatus according to this invention uses the operation module to analyze the characteristic of each image, and the gain module adjusts the image signals according to the analyzed results. In this way, the adjusting apparatus can dynamically adjust the contrasts of different image signals; thus, the adjusted image signals have better contrasts than those in prior arts.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
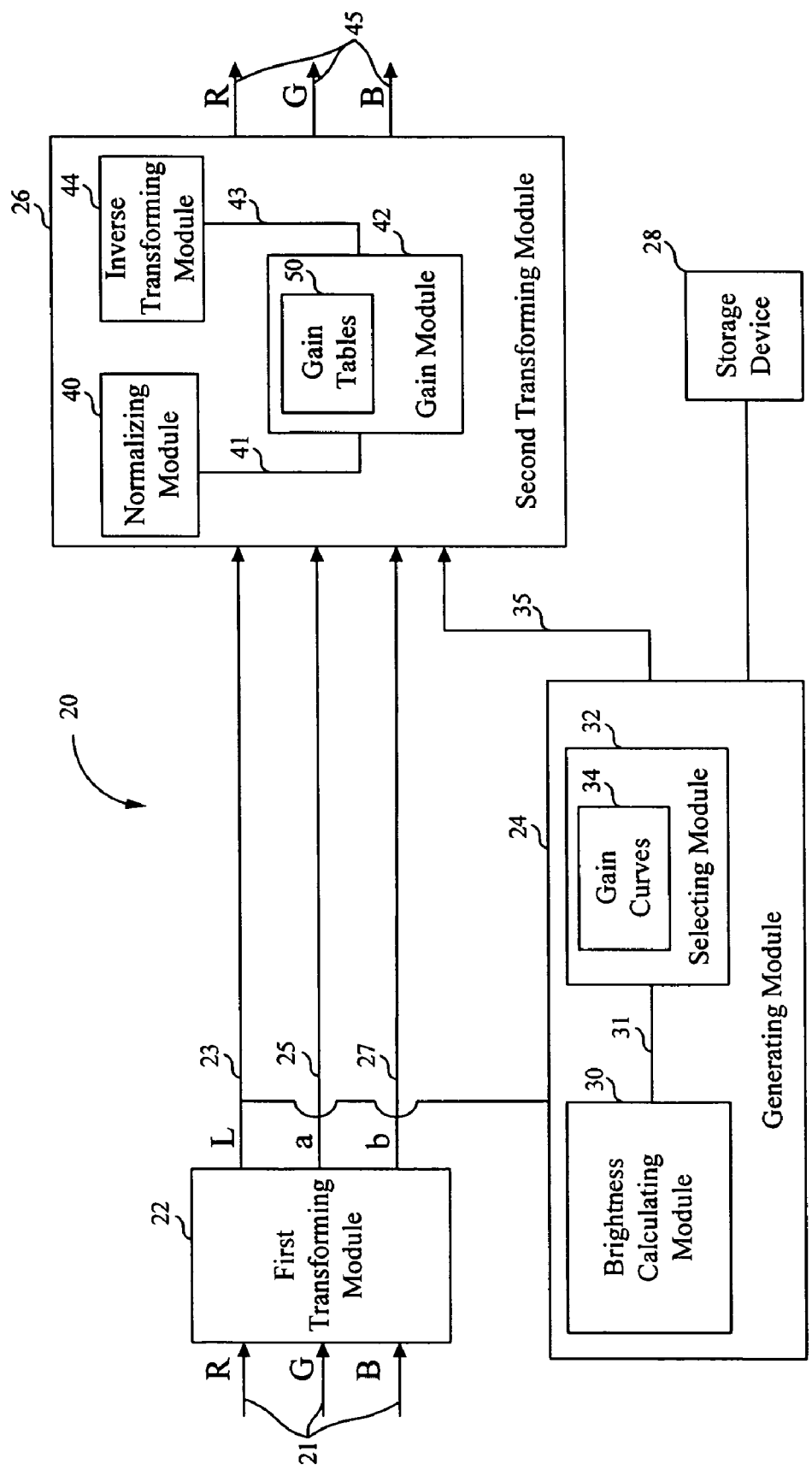
FIG. 1 shows the block diagram of the dynamic image adjusting apparatus according to this invention.

Please refer to FIG. 1. FIG. 1 shows the block diagram of the dynamic image adjusting apparatus 20 according to the invention. The dynamic image adjusting apparatus 20 is used for dynamically adjusting the contrast of a first image signal 21 which includes a plurality of pixels. The adjusting apparatus 20 includes a first transformation module 22, an operation module 24, and a second transformation module 26.

The first transformation module 22 receives the first image signal 21 to generate a plurality of adjusting signals, wherein each pixel of the first image signal 21 corresponds to one of the plurality of adjusting signals. Each of the plurality of adjusting signals includes a brightness signal 23, a first color signal 25, and a second color signal 27.

The operation module 24 is coupled to the first transformation module 22 and receives a first set of adjusting signals among the plurality of adjusting signals to generate a first gain curve.

In this preferred embodiment, the operation module 24 includes a brightness calculation module 30 and a selection module 32. The brightness calculation module 30 generates an average brightness signal 31 according to the brightness signal 23 of each of the first set of adjusting signals. The selection module 32 is coupled to the brightness calculation module 30. The selection module 32 selects the first gain curve 35 from a plurality of gain curves 34 pre-stored in the selection module and according to the average brightness signal 31.

The second transformation module 26 is coupled to the operation module 24 and the first transformation module 22.

The second transformation module 26 generates a second image signal 45 according to the first gain curve 35 and the plurality of adjusting signals.

The second transformation module 26 includes a normalization module 40, a gain module 42, and an inverse transformation module 44. The normalization module 40 generates a plurality of normalized adjusting signals 41 according to the plurality of adjusting signals. The gain module 42 is coupled to the normalization module 40 and generates a plurality of gain signals 43 according to the plurality of normalized adjusting signals 41 and the first gain curve 35. The inverse transformation module 44 is coupled to the gain module 42 and generates the second image signal 45 according to the plurality of gain signals 43.

The gain module 42 includes a plurality of gain tables 50, wherein each gain table 50 corresponds to one of the plurality of gain curves 34. The gain module 42 generates the plurality of gain signals 43 according to the plurality of normalized adjusting signals 41 and a first gain table corresponding to the first gain curve 35.

In this preferred embodiment, the adjusting apparatus 20 further includes a storage device 28 coupled to the operation module 24. The storage device 28 is used for storing the average brightness signal 31 and the brightness signal of each of the first set of adjusting signals.

In another preferred embodiment according to this invention, the adjusting apparatus can select the average brightness signal from the storage device and use the average brightness signal for calculating the average value. Sometimes, because of the limitations in operation speed of digital circuits, the adjusting apparatus cannot complete the whole calculation before the image is displayed. Since adjacent images in a video file are usually similar, it is reasonable and practical that the adjusting apparatus uses the calculated average brightness signal of a previous image to adjust the contrast of the next image. However, with this method, adjacent images with large differences between each other would be flickered when displayed. Therefore, in this preferred embodiment, an operation of calculating average value is added. For example, the adjusting apparatus uses the calculated average value of the brightness signals of the first 31 images to adjust the 32nd images; thus, the flicker effect due to large differences between images can be reduced.

Figure 2:
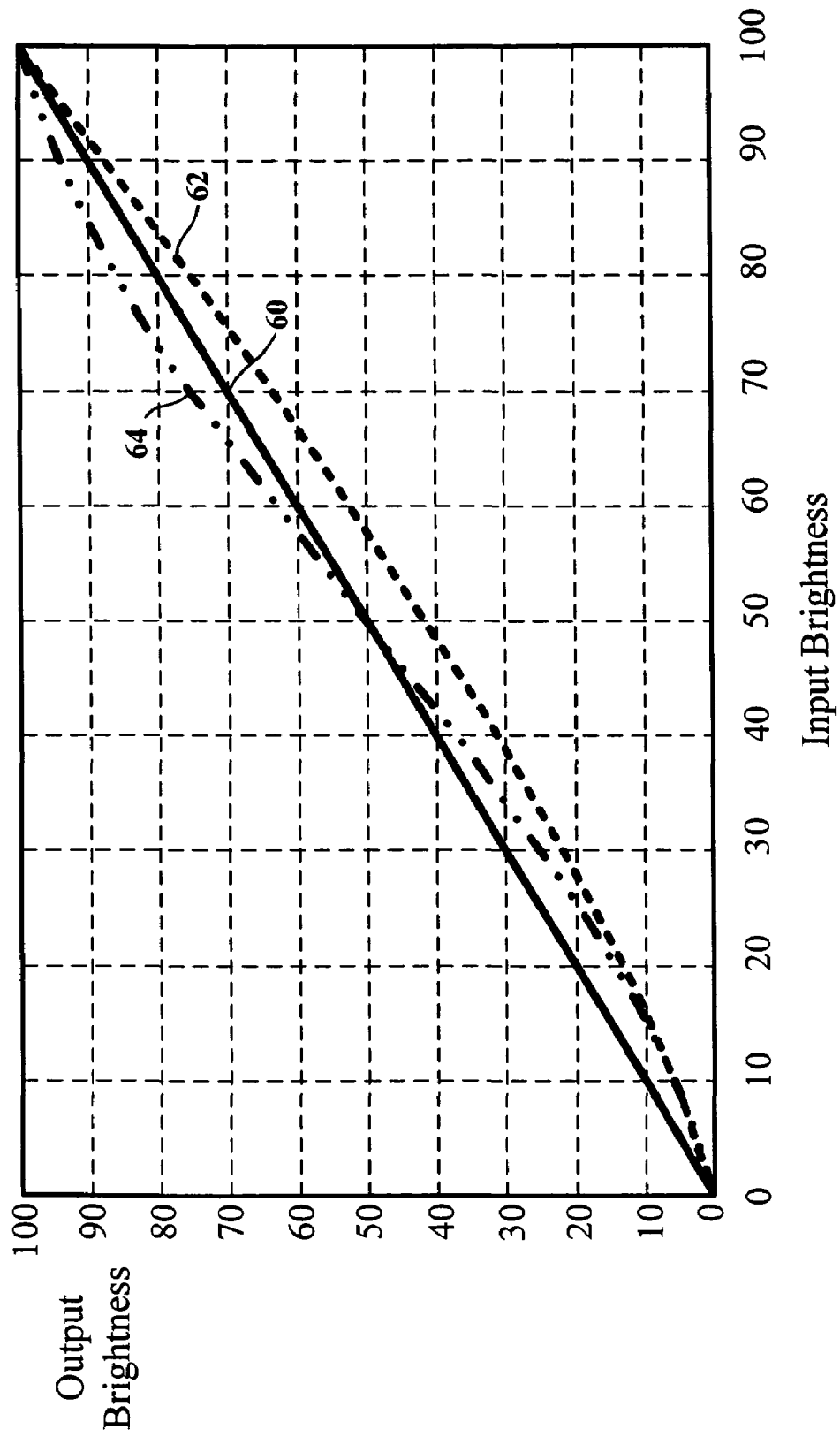
FIG. 2 shows the gain curve used by the adjusting apparatus according to this invention.

Please refer to FIG. 2. FIG. 2 shows the gain curve used by the adjusting apparatus in this invention. As shown in FIG. 2, the horizontal axis represents the input brightness and the vertical axis represents the adjusted output brightness. Curve 60 shows a linear line with a slope equal to one; the brightness needs no adjustment under this condition. Curve 62 is similar to a Gamma curve used for images with high brightness. Curve 64 is a reverse curve that makes bright areas brighter and dark areas darker. The amplitude of curve 64 is adjustable to fit the images with middle or low brightness. The dynamic contrast adjustment according to this invention is dynamically selecting a gain curve in FIG. 2 according to the brightness characteristic of the whole image.

Figure 3:
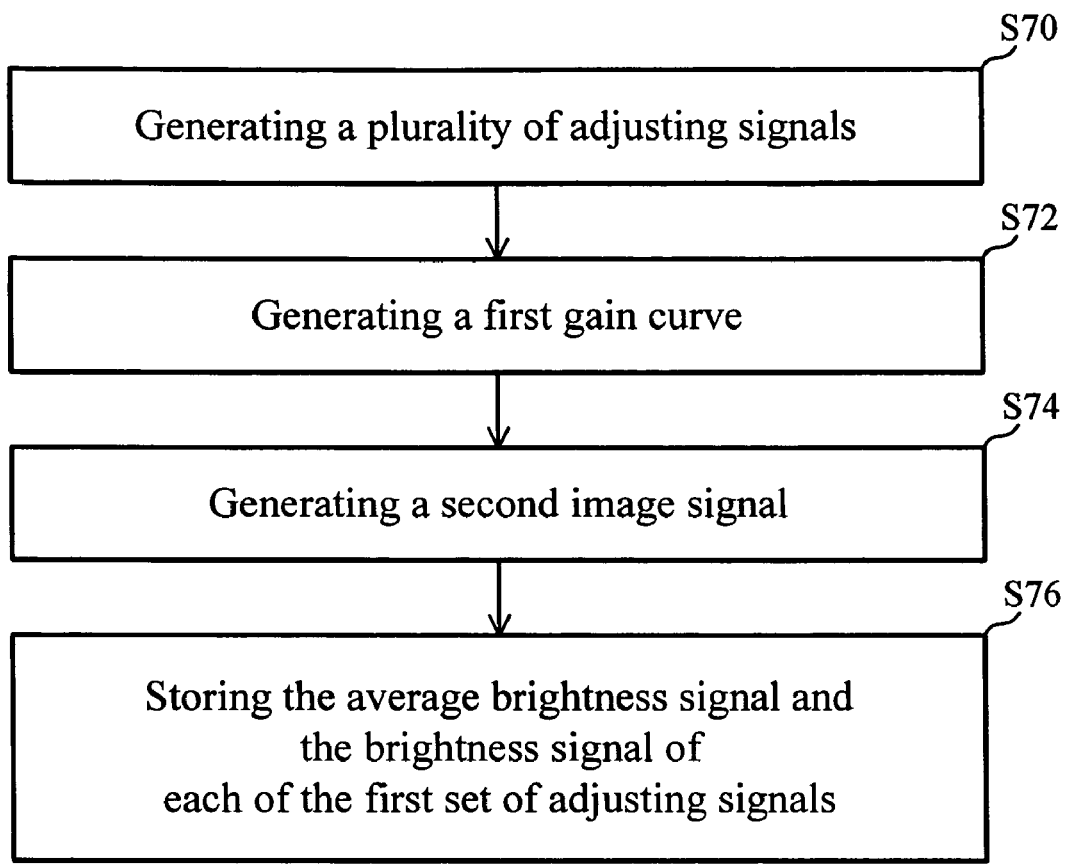
FIG. 3 shows the flow chart of the dynamic image adjusting method according to this invention.

Please refer to FIG. 3. FIG. 3 shows the flow chart of the dynamic image adjusting method according to this invention. This invention provides a dynamic image adjusting method for dynamically adjusting the contrast of a first image signal, wherein the first image signal includes a plurality of pixels, and the adjusting method includes the steps of:

S70: receiving the first image signal to generate a plurality of adjusting signals, wherein each pixel of the first image signal corresponds to one adjusting signal among the plurality of adjusting signals; each of the plurality of adjusting signals includes a brightness signal, a first color signal, and a second color signal;

S72: receiving a first set of adjusting signals among the plurality of adjusting signals to generate a first gain curve;

S74: generating a second image signal according to the first gain curve and the plurality of adjusting signals; and S76: storing the average brightness signal and the brightness signal of each of the first set of adjusting signals.

Figure 4:
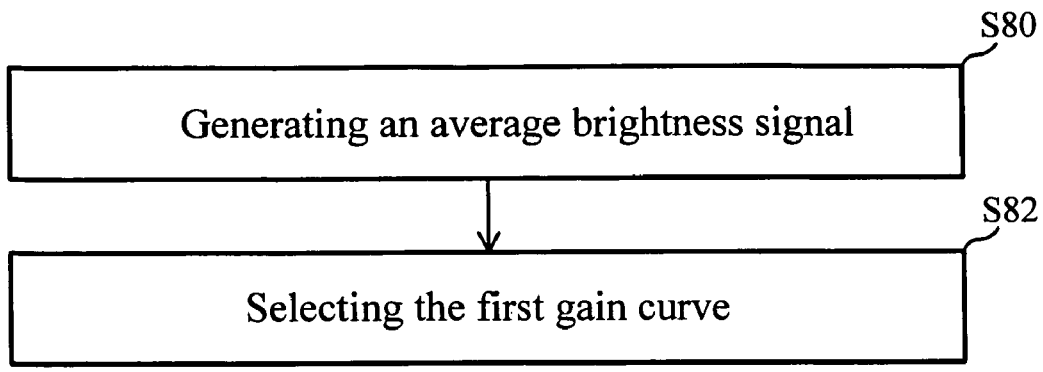
FIG. 4 shows the flow chart of how the dynamic image adjusting method selects the first gain curve.

Please refer to FIG. 4, FIG. 4 shows the flow chart of how the dynamic image adjusting method according to this invention selects the first gain curve, wherein the method previously stores a plurality of gain curves, and as shown in FIG. 4, the step S72 includes the sub-steps of:

S80: generating an average brightness signal according to the brightness signal of each of the first set of adjusting signals; and S82: selecting the first gain curve from the plurality of gain curves according to the average brightness signal.

Figure 5:
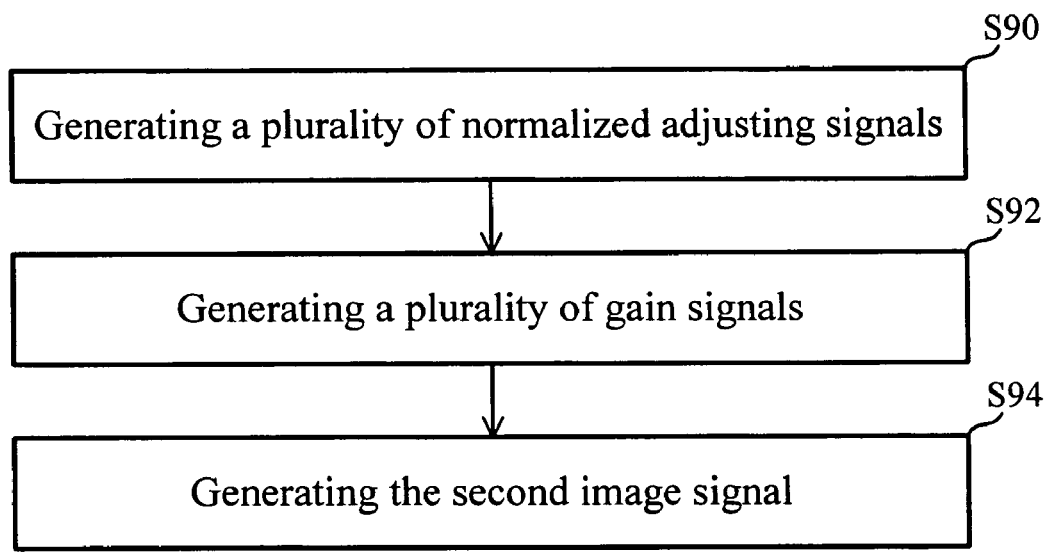
FIG. 5 shows the flow chart of how the dynamic image adjusting method generates the second image signal.

Please refer to FIG. 5, FIG. 5 shows the flow chart of how the image adjusting method according to this invention generates the second image signal. As shown in FIG. 5, the step S74 further includes the sub-steps of:

S90: generating a plurality of normalized adjusting signals according to the plurality of adjusting signals;

S92: generating a plurality of gain signals according to the plurality of normalized adjusting signals and the first gain curve; wherein each of the plurality of gain curves corresponds to one of the plurality of gain tables, and this step generates the plurality of gain signals according to the plurality of normalized adjusting signals and a first gain table corresponding to the first gain curve; and S94: generating the second image signal according to the plurality of gain signals.

The brightness calculation device first generates the average brightness of the first set of adjusting signals, and the selection module selects a gain curve according to the average brightness. Then, the normalization module normalizes the adjusting signals to generate the normalized adjusting signals, and adjust the normalized adjusting signals with the gain value in the gain table corresponding to the gain curve to get the adjusted gain signal. The inverse transformation module is used to transform the gain signal to generate the second image signal for displaying whereby the adjusting method is completed.

The dynamic image adjusting apparatus according to this invention can dynamically adjust the contrast of each image according to the content of the image. Furthermore, the color space used by this invention is the CIE Lab color space proposed by CIE (Commission Internationale de L'Éclairage), i.e. the Lab color space. There are two reasons for using the Lab color space, one is that the Lab color space is a perceptional uniform color space, another is that in the Lab color space brightness and colors are separated and the separation is more obvious than other color spaces. Accordingly, the dynamic image adjusting apparatus according to this invention can enhance the quality of images, make images more visually saturated, and provide better display qualities.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. A computer readable storage medium storing a set of instructions executable by a computer system for dynamically adjusting the contrast of a first image signal which comprises a plurality of pixels, the set of instructions comprising:

instructions for receiving the first image signal and generating a plurality of adjusting signals based on the first image signal, wherein each pixel of the first image signal corresponds to one of the plurality of adjusting signals, respectively;

instructions for receiving a first set of adjusting signals among the plurality of adjusting signals, comprising:

instructions for generating an average brightness signal according to the brightness signal of each of the first set of adjusting signals; and instructions for selecting the first gain curve from a plurality of gain curves pre-stored in the selection module according to the average brightness signal; and instructions for generating a second image signal according to the first gain curve and the plurality of adjusting signals;

wherein the instructions for generating the second image signal comprises:

instructions for generating a plurality of normalized adjusting signals according to the plurality of adjusting signals;

instructions for generating a plurality of gain signals according to the plurality of normalized adjusting signals and the first gain curve; and instructions for generating the second image signal according to the plurality of gain signals.

2. The computer readable storage medium of claim 1, wherein each of the plurality of adjusting signals comprises a brightness signal, a first color signal, and a second color signal.

3. The computer readable storage medium of claim 1, wherein each of the plurality of gain curves corresponds to one of a plurality of gain tables, and the instructions for generating the plurality of gain signals generates the plurality of gain signals according to the plurality of normalized adjusting signals and a first gain table corresponding to the first gain curve.

4. A method of operating a dynamic image adjusting apparatus for dynamically adjusting the contrast of a first image signal, wherein the first image signal comprises a plurality of pixels, the method comprising the steps of:

(a) the dynamic image adjusting apparatus receiving the first image signal to generate a plurality of adjusting signals, wherein the plurality of adjusting signals are Commission Internationale de L' Éclairage Lab signals, each pixel of the first image signal corresponds to one adjusting signal among the plurality of adjusting signals, respectively;

(b1) the dynamic image adjusting apparatus receiving a first set of adjusting signals among the plurality of adjusting signals, and generating an average brightness signal according to the brightness signal of each of the first set of adjusting signals;

(b2) the dynamic image adjusting apparatus selecting the first gain curve from the plurality of gain curves according to the average brightness signal; and (c) the dynamic image adjusting apparatus generating a second image signal according to the first gain curve and the plurality of adjusting signals, wherein the second image signal has a second contrast value different from a first contrast value of the first image signal;

wherein the step (c) further comprises the sub-steps of:

(c1) the dynamic image adjusting apparatus generating a plurality of normalized adjusting signals according to the plurality of adjusting signals;

(c2) the dynamic image adjusting apparatus generating a plurality of gain signals according to the plurality of normalized adjusting signals and the first gain curve; and (c3) the dynamic image adjusting apparatus generating the second image signal according to the plurality of gain signals.

5. The method of claim 4, wherein each of the plurality of adjusting signals comprises a brightness signal, a first color signal, and a second color signal.

6. The method of claim 4, further comprising the step of:

the dynamic image adjusting apparatus storing the average brightness signal and the brightness signal of each of the first set of adjusting signals.

7. The method of claim 4, wherein each of the plurality of gain curves corresponds to one of the plurality of gain tables, and in the step (c2), the dynamic image adjusting apparatus generates the plurality of gain signals according to the plurality of normalized adjusting signals and a first gain table corresponding to the first gain curve.

* * * * *